(12) United States Patent
Wu

(10) Patent No.: US 7,133,152 B2
(45) Date of Patent: Nov. 7, 2006

(54) POST RIP PAPER CONVERSION

(75) Inventor: Vincent Wu, Irvine, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 880 days.

(21) Appl. No.: 10/094,347

(22) Filed: Mar. 8, 2002

(65) Prior Publication Data

US 2003/0160990 A1 Aug. 28, 2003

Related U.S. Application Data

(60) Provisional application No. 60/360,439, filed on Feb. 28, 2002.

(51) Int. Cl.
*G06K 15/02* (2006.01)
*G06F 3/12* (2006.01)

(52) U.S. Cl. .................. 358/1.2; 358/1.13; 358/1.9

(58) Field of Classification Search ............... 358/1.2, 358/1.1, 1.6, 1.9, 1.11, 1.12, 1.13, 1.14, 1.15, 358/1.16, 1.18, 3.12, 451, 449, 468, 528; 382/254, 298

See application file for complete search history.

(56) References Cited

U.S. PATENT DOCUMENTS

| | | |
|---|---|---|
| 4,710,886 A | 12/1987 | Heath |
| 4,943,936 A | 7/1990 | Hirai et al. |
| 5,008,709 A | 4/1991 | Shinada et al. |
| 5,058,038 A | 10/1991 | Motoyama et al. |
| 5,097,417 A | 3/1992 | Ukon |
| 5,121,468 A | 6/1992 | Daino |
| 5,175,634 A | 12/1992 | Matsuzaki |
| 5,196,943 A | 3/1993 | Hersee et al. |
| 5,204,758 A | 4/1993 | Sakamoto |
| 5,220,431 A | 6/1993 | Yamagguchi |
| 5,265,209 A | 11/1993 | Kageyama et al. |
| 5,267,047 A | 11/1993 | Argenta et al. |
| 5,287,199 A | 2/1994 | Zoccolillo |
| 5,412,483 A | 5/1995 | Ludlow et al. |
| 5,428,459 A | 6/1995 | Asai |
| 5,438,433 A | 8/1995 | Reifman et al. |
| 5,448,346 A | 9/1995 | Tabata |
| 5,493,635 A | 2/1996 | Brindle et al. |
| 5,504,843 A | 4/1996 | Catapano et al. |
| 5,537,518 A | 7/1996 | Hasegawa |
| 5,537,550 A | 7/1996 | Russell et al. |
| 5,537,626 A | 7/1996 | Kraslavsky et al. |
| 5,563,713 A | 10/1996 | Sugiura |
| 5,610,728 A | 3/1997 | Sobue |
| 5,613,160 A | 3/1997 | Kraslavsky et al. |
| 5,621,539 A | 4/1997 | Brown et al. |
| 5,625,466 A | 4/1997 | Nakajima |
| 5,638,495 A | 6/1997 | Arai |
| 5,642,205 A | 6/1997 | Kassmann |
| 5,671,463 A | 9/1997 | Morikawa et al. |

(Continued)

*Primary Examiner*—Dov Popovici
(74) *Attorney, Agent, or Firm*—Tucker Ellis & West LLP

(57) ABSTRACT

A system and method for converting an image to the available paper size being used by the image forming apparatus. A print job is sent to a spooler. A RIP processor then generates image faces for the print job. After the RIP process, the image forming apparatus converts the print job to the paper being used by the image forming apparatus. The print job may also be scaled if desired. Typical conversions are Letter size to A4, A4 to Letter size, Ledger size to A3, and A3 to Ledger size.

14 Claims, 1 Drawing Sheet

U.S. PATENT DOCUMENTS

| | | |
|---|---|---|
| 5,694,618 A | 12/1997 | Hibino |
| 5,712,712 A | 1/1998 | Sayward |
| 5,719,685 A | 2/1998 | Kimura et al. |
| 5,732,196 A | 3/1998 | Watanabe |
| 5,732,403 A | 3/1998 | Nakamura |
| 5,734,760 A | 3/1998 | Yoshida |
| 5,784,177 A | 7/1998 | Sanchez et al. |
| 5,835,920 A | 11/1998 | Horton |
| 5,860,073 A | 1/1999 | Ferrel et al. |
| 5,911,037 A | 6/1999 | Yoshida |
| 5,923,826 A | 7/1999 | Grzenda et al. |
| 5,930,005 A | 7/1999 | Yoshida |
| 5,956,737 A | 9/1999 | King et al. |
| 5,961,226 A | 10/1999 | Nishida |
| 5,973,791 A | 10/1999 | Yamamuro et al. |
| 5,995,986 A | 11/1999 | Ueda et al. |
| 6,023,714 A | 2/2000 | Hill et al. |
| 6,028,982 A | 2/2000 | Toyoda et al. |
| 6,076,120 A | 6/2000 | Hatayama |
| 6,088,138 A | 7/2000 | Sakai et al. |
| 6,088,702 A | 7/2000 | Plantz et al. |
| 6,108,676 A | 8/2000 | Nakatsuyama |
| 6,141,705 A | 10/2000 | Anand et al. |
| 6,144,974 A | 11/2000 | Gartland |
| 6,161,114 A | 12/2000 | King et al. |
| 6,163,784 A | 12/2000 | Taguchi |
| 6,172,763 B1 | 1/2001 | Toyoda et al. |
| 6,208,427 B1 | 3/2001 | Lee |
| 6,243,721 B1 | 6/2001 | Duane et al. |
| 6,247,028 B1 | 6/2001 | Torisaki |
| 6,247,135 B1 | 6/2001 | Feague |
| 6,269,380 B1 | 7/2001 | Terry et al. |
| 6,327,387 B1 | 12/2001 | Naoi et al. |
| 6,327,599 B1 | 12/2001 | Warmus et al. |
| 6,330,071 B1 | 12/2001 | Vidyanand |
| 6,338,076 B1 | 1/2002 | Hidding et al. |
| 6,343,197 B1 | 1/2002 | Serizawa et al. |
| 6,559,971 B1 * | 5/2003 | Watts et al. .................. 358/1.2 |
| 6,611,347 B1 * | 8/2003 | Okada et al. ............... 358/1.15 |
| 6,819,442 B1 * | 11/2004 | Takahashi .................. 358/1.15 |
| 2005/0012941 A1 * | 1/2005 | Takahashi .................... 358/1.2 |

* cited by examiner

POST RIP PAPER CONVERSION

CROSS-REFERENCE TO RELATED APPLICATIONS

This application claims the benefit of U.S. Provisional Application No. 60/360,439, filed on Feb. 28, 2002.

STATEMENT REGARDING FEDERALLY SPONSORED RESEARCH OR DEVELOPMENT

Not applicable.

REFERENCE TO A "MICROFICHE APPENDIX"

Not applicable.

BACKGROUND OF THE INVENTION

1. Field of the Invention

The present invention generally relates to image forming and more specifically to a system and method for an image forming apparatus to convert an image for outputting on a paper size that is different from the image size.

2. Description of the Related Art Includind Information Disclosed Under 37 CFR 1.97 and 37 CFR 1.98.

As documents are transmitted between various countries, oftentimes the papers size of the image forming apparatus is incompatible with the size of the original image. In other countries, particularly in Europe, often times documents are printed with mixed letter and A4 paper sizes. The controller will rasterize "RIP" the image at the paper size as specified by the print driver and prompt a user to input the correct size paper in the Bypass tray of the image forming apparatus. However, Letter paper size is not popular in European countries, hence a need exists for a controller to convert Letter or Ledger paper size to A4 or A3 paper size respectively. More generally, a need exists for a printer which can convert an image sent to it to the proper paper size. RIP can do the conversion during the its processing of the print job. However, this technique has been slow.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of instrumentalities and combinations particularly pointed out in the appended claims.

BRIEF SUMMARY OF THE INVENTION

In view of the aforementioned needs, the invention contemplates a system and method for enabling a user to select whether an image should be converted to fit the paper size loaded in the printer. A client sends a PCL/PS print job to a spooler. RIP then processes the print job and generates image faces. The controller then checks the system settings to determine if paper conversion is on or off, whether scaling is on or off, and the region the copier is located. If paper conversion is on, the controller will call an image library to perform the conversion according to the scaling setting and the region setting. If paper conversion is off then the controller will continue with normal processing and put the image faces into the print queue. The print module in the controller will pick up the job in the queue and send it to the print device for printing.

Typically, the controller will have the region setting embedded in firmware. However, as those skilled in the art can readily appreciate, the region setting can be set by utilizing configuration files or other software implementations. A menu that can be generated either at the peripheral or at the client enables the user to select whether conversion is desired, and if so whether scaling is desired.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

BRIEF DESCRIPTION OF THE SEVERAL VIEWS OF THE DRAWING

The drawings illustrate the best mode presently contemplated of carrying out the invention.

This the drawings.

DETAILED DESCRIPTION OF INVENTION

Figure 1:
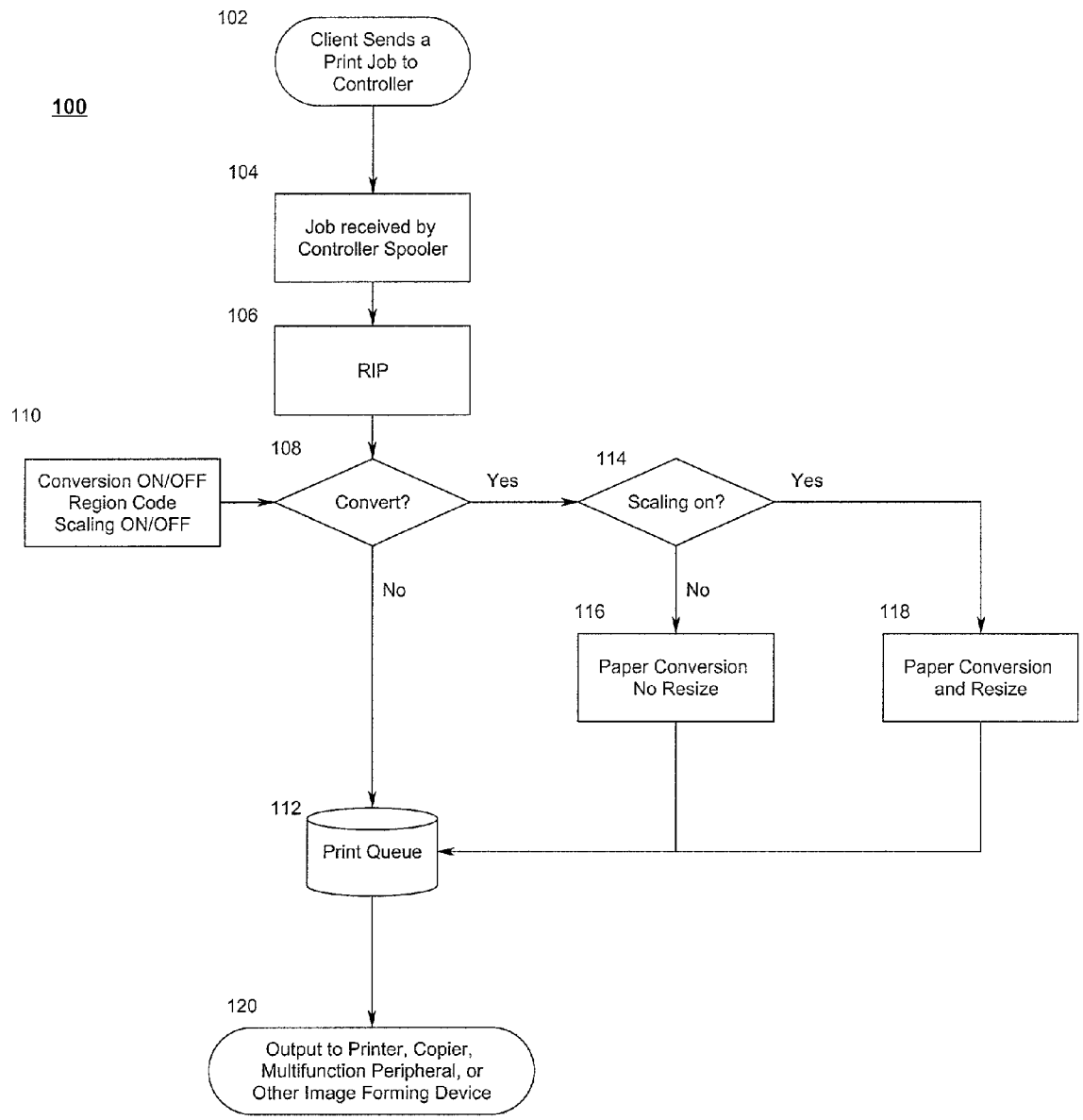
FIG. 1 is a block diagram showing the method contemplated by the present invention.

The present invention relates to a system and method wherein the controller of an image forming apparatus converts an image sent to the apparatus for printing to the paper size being utilized by the image forming apparatus. The paper conversion of the present apparatus is done after RIP processing of the print job.

In the preferred embodiment, the controller can determine the region it is operating, and hence the expected paper size in the output tray. For controllers used by Toshiba, the region setting is in the controller's firmware. However, the present invention would also work for controller's that store configuration on non-volatile RAM, or in files such as a DOS config.sys file or a Windows .ini file.

In Europe and Asia, Letter size is converted to A4 and Ledger size is converted to A3. For the United States and Canada, A4 size is converted to letter size and A3 size is converted to Ledger. The paper conversion option can be turned on or off via a Web or Network Administration or at the copier panel.

The present invention contemplates two types of conversion. First is non-scaling conversion. In non-scaling conversion, the print image will be cut off from the edge to fit into the destination paper size, for example a Letter size image is wider than A4, therefore the ridge edge of a Letter size image being printed on A4 will be cut off. In non-scaling resolution the print resolution is unchanged, therefore a print job submitted at 600 DPI will be output at 600 DPI after conversion. In scaling conversion, the print image will be resized to fit onto the destination paper size. Because in scaling conversion the print image is resized, the resolution of the print job will be changed. Like the paper conversion option, the scaling option can be turned on or off via a Web or Network Administration or at the copier panel.

Referring to FIG. 1, there is shown the steps used by the method of the present invention, generally designated 100. At step 102, the process is started when a client sends a print job to the image forming apparatus controller (not shown) for processing. As shown in step 104, the controller then spools the print job. At step 106, the controller then performs a RIP of the print job. At step 108 the controller determines whether conversion is necessary. In making the decision, the controller receives inputs as shown in block 110 for conversion, scaling, and the region setting of the image forming apparatus. If conversion is set to off, then the print job is sent to the Print Queue as shown in step 112.

If conversion is set to yes, the process then proceeds to step 114. If at step 114 scaling is off, then the paper conversion will occur without the image being resized. If at step 114 scaling is on, then the image will be resized and scaled. The conversion is done by calling an image library. One such library available for the conversion is Image Pro V12 available from Lead Tools, 1201 Greenwood Cliff, Suite 200, Charlotte, N.C. 28204. After conversion, the print job is sent to the printer as shown in step 112. After the print queue receives the job, the print job is then outputted to a Printer, Copier, Multifunction Peripheral (MFP), facsimile or other image forming device as shown in step 120.

Although the invention has been shown and described with respect to a certain preferred embodiment, it is obvious that equivalent alterations and modifications will occur to others skilled in the art upon the reading and understanding of this specification. The present invention includes all such equivalent alterations and modifications and is limited only by the scope of the following claims.

What is claimed is:

1. A system for selectively sizing a bitmapped image comprising:
    means adapted for receiving image face format data representative of regional output format settings of bitmapped image data in a controller associated with a document rendering device;
    means adapted for receiving, from a storage associated with the controller, region data representative of regional default output characteristics associated therewith;
    alteration means adapted for generating a modified bitmapped image by performing at least one of a truncation and resizing of the bitmapped image data in the event that the regional output format settings do not correspond with the regional default output characteristics ; and
    means adapted for outputting the modified bitmapped image data to the associated document rendering device.

2. The system for selectively sizing a bitmapped image of claim 1 wherein the alteration means further comprising scaling means adapted for scaling the received bitmapped image data to correspond with the document output characteristics.

3. The system for selectively sizing a bitmapped image of claim 1 wherein the alteration means is adapted to retain the resolution of the received bitmapped image data during the modification of the bitmapped image data.

4. The system for selectively sizing a bitmapped image of claim 1 further comprising spooling means adapted for spooling the received bitmapped image data.

5. The system for selectively sizing a bitmapped image of claim 4 wherein the spooling means spools the received bitmapped image data prior to the alteration means selectively modifying the bitmapped image data.

6. The system for selectively sizing a bitmapped image of claim 1 further comprising means adapted for rendering the received bitmapped image data to a tangible output medium.

7. The system for selectively sizing a bitmapped image of claim 1 wherein the alteration means selectively modifies the bitmapped image data from at least one of letter size to A4 size, A4 size to letter size, ledger size to A3 size, and A3 size to ledger size.

8. A method for selectively sizing a bitmapped image comprising the steps of:
    receiving image face format data representative of regional output format settings of bitmapped image data in a controller associated with a document rendering device;
    receiving, from a storage associated with the controller, region data representative of regional default output characteristics associated therewith;
    generating a modified bitmapped image by performing at least one of a truncation and resizing of the bitmapped image data in the event that the regional output format settings do not correspond with the regional default output characteristics; and
    outputting the modified bitmapped image data to the associated document rendering device.

9. The method for selectively sizing a bitmapped image of claim 8 further comprising the step of scaling the received bitmapped image data to correspond with the document output characteristics.

10. The method for selectively sizing a bitmapped image of claim 8 wherein the step of generating a modified bitmapped image data includes the step of retaining the resolution of the bitmapped image data.

11. The method for selectively sizing a bitmapped image of claim 8 further comprising the step of spooling the received bitmapped image data.

12. The method for selectively sizing a bitmapped image of claim 11 wherein the step of spooling the received bitmapped image data is performed prior to the step of generating a modified bitmapped image data.

13. The method for selectively sizing a bitmapped image of claim 8 further comprising the step of rendering the received bitmapped image data to a tangible output medium.

14. The method for selectively sizing a bitmapped image of claim 8 wherein the step of generating a modified bitmapped image modifes the bitmapped image data from at least one of letter size to A4 size, A4 size to letter size, ledger size to A3 size, and A3 size to ledger size.

* * * * *